Figure 1:
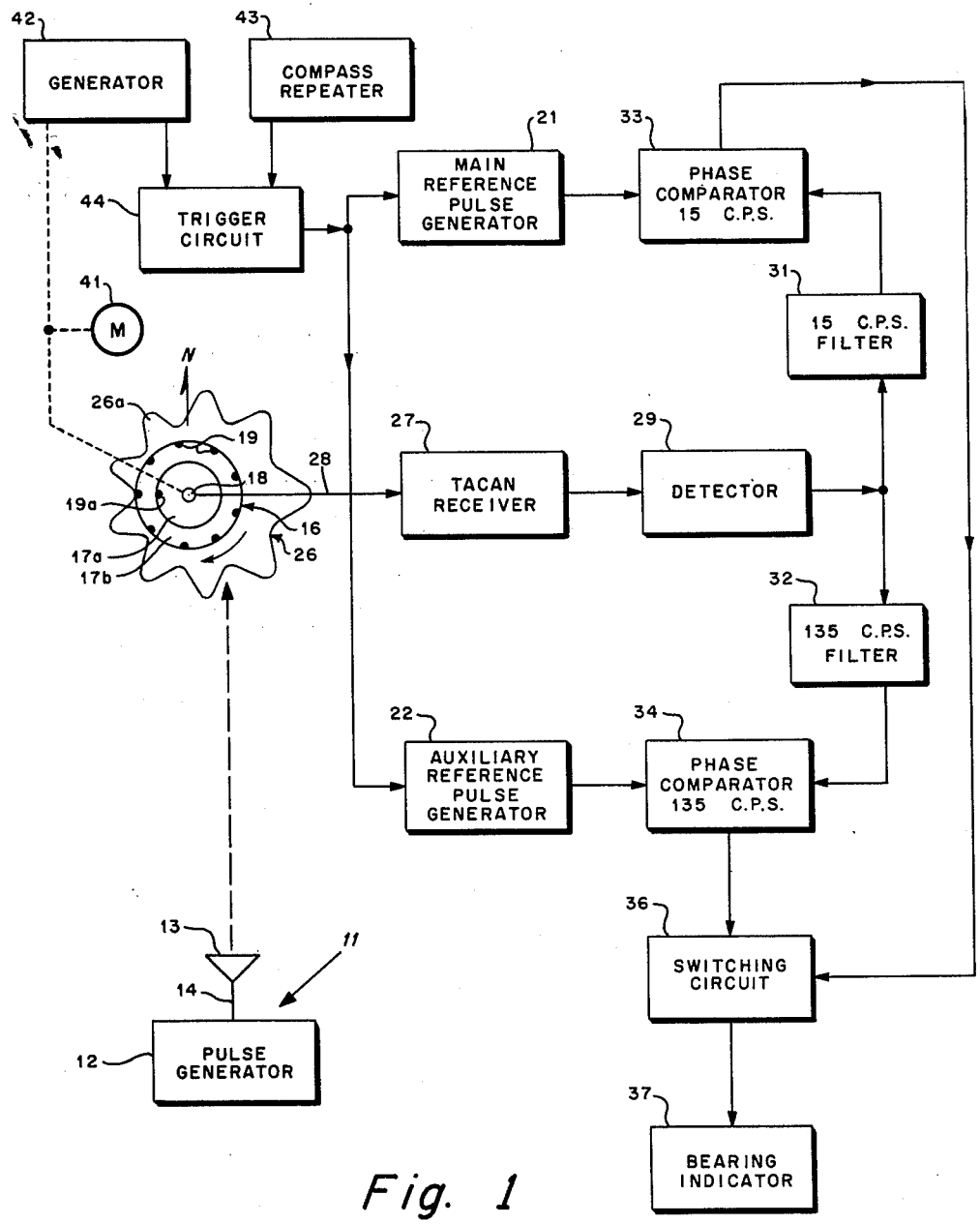

INVENTOR.
OSCAR SHAMES

INVENTOR.
OSCAR SHAMES 3,195,133
AIR-TO-AIR BEARING SYSTEM
Oscar Shames, Philadelphia, Pa., assignor to the United States of America as represented by the Secretary of the Navy
Filed Sept. 27, 1962, Ser. No. 227,665
4 Claims. (Cl. 343—106)
(Granted under Title 35, U.S. Code (1952), sec. 266)

The invention described herein may be manufactured and used by or for the Government of the United States of America for governmental purposes without the payment of any royalties thereon or therefor.

This invention relates to a direction finding system, and more particularly to an air-to-air bearing system wherein one airborne transmitter may provide bearing information to an unlimited number of aircraft.

In a conventional TACAN system the ground station radiates pulses which act as reference signals. Other radiated pulses from the ground station have amplitudes which are caused to vary according to a sinusoid, that is the pulses are modulated by the rotation of the particular radiation pattern of the antenna. The phase of the modulated signal varies in accordance with different bearing angles from the ground station. Thus, a receiver aircraft receives a modulated signal the envelope of which has a phase relationship to the received reference pulses indicative of the receiver aircraft's bearing relative to the ground station. The aircraft is equipped with phase comparison circuitry which provides a signal proportional to the phase difference between a selected reference signal and the modulated signal which energizes a motor for driving an indicator in accordance with the phase difference signal to provide visual indication to the aircraft's pilot of bearing relative to the ground station.

In the conventional TACAN signal the transmitter at the ground station must have the capability of transmitting approximately 3600 pulses per second. Of these 3600 pulses per second 900 pulses per second are required to provide the reference bearing signals. The transmitter at the ground station has a rotating antenna which imposes amplitude modulation upon the pulses transmitted by the ground station beacon.

By utilizing an antenna having a radiation pattern comprising a fundamental cardioid upon which a nine lobed pattern has been superimposed rotated at the rate of 15 revolutions per second, a main reference pulse is transmitted each time the lobe designated as the major lobe passes a reference direction, such as East, and an auxiliary reference pulse for each minor lobe or 40° sector. Since the antenna is rotated at the rate of 15 revolutions per second, the transmitted pulses are amplitude modulated at 15 and 135 cycles. The main reference pulse is compared in phase with the 15 cycle amplitude modulation signal in the airborne receiver to give bearing of the aircraft relative to the ground beacon. To provide greater accuracy the auxiliary reference pulses are compared in phase with the 135 cycle amplitude modulation and the aircraft's indicator is corrected accordingly.

It is the purpose of the present invention to greatly reduce the number of pulses that must be transmitted by the master station whether it is ground or airborne. By greatly reducing the number of pulses that must be transmitted by the master station much less complicated circuitry is needed as well as much less power which greatly reduces the bulk and weight of the master station enabling it to be conveniently carried by a moderate sized aircraft. The purpose of the present invention is accomplished by placing the rotating antenna at the airborne receivers using an omni-antenna at the master station which may be either ground or airborne. At the same time each airborne receiver is provided with means for generating its own reference pulses referenced either to its own heading or to some magnetic bearing. By virtue of this arrangement the master transmitting station need only transmit enough pulses per second to support the modulated signals at the receiving antennas.

Therefore, it is an object of the present invention to provide an air-to-air bearing system which greatly reduces the power necessary at the master station by substantially reducing the number of pulses per second required to be transmitted by the master station.

Another object of the present invention is to provide an air-to-air bearing system wherein each airborne TACAN equipment may be readily used either as a TACAN receiver or transmitter or both.

Another object of the present invention is to provide an air-to-air bearing system wherein the transmitting station may be readily airborne.

A further object of the present invention is to provide an air-to-air bearing system wherein the rotating antenna is mounted on the receiver aircraft and the required reference pulses are locally generated.

Still another object of the present invention is to provide an air-to-air bearing system which greatly reduces the number of pulses that must be transmitted by the transmitting station and the power required by the transmitting station so that such a reduction in size, weight and complexity of the transmitting station is possible that it may be carried by small sized aircraft.

A still further object of the present invention is to provide a completely airborne TACAN bearing system which is compatible with TACAN equipment in aircraft and which may be used with a minimum of change to the existing airborne TACAN equipment.

Figure 2:
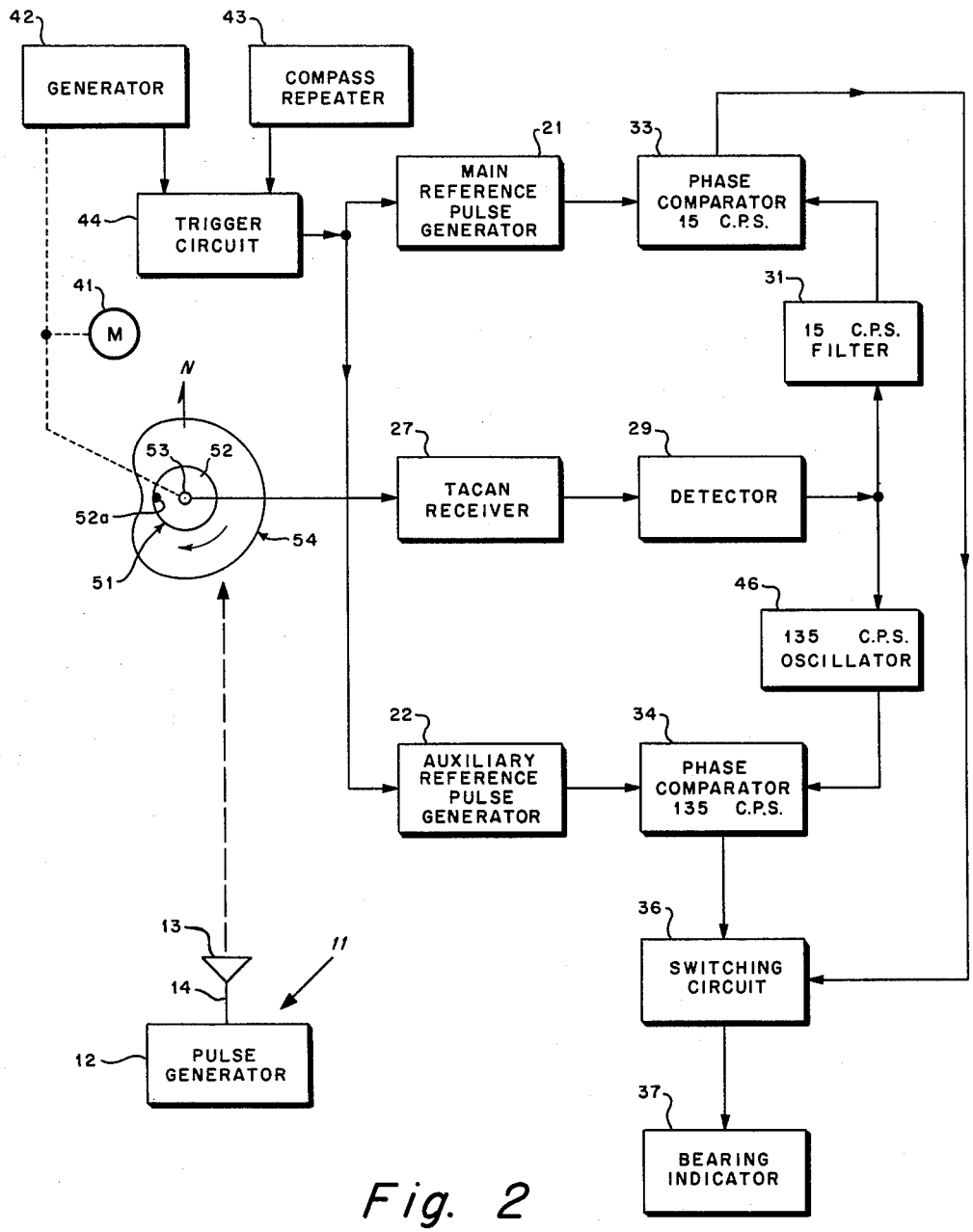

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 illustrates in block diagram form a first embodiment of the present invention; and FIG. 2 illustrates in block diagram form a second embodiment of the present invention.

Referring now more particularly to FIG. 1 there is shown a master station 11 which comprises a pulse generator 12 capable of generating coded pulse pairs of the type commonly used in TACAN bearing systems. The pulse output of pulse generator 12 is connected via cable 14 to omni-antenna 13 which radiates 1350 or more pulses per second in all directions.

Reference numeral 16 illustrates an antenna which is capable of providing an antenna radiation pattern which is composed of a fundamental cardioid upon which a nine lobed pattern has been superimposed.

Antenna system 16 may comprise inner and outer cylinders 17a and 17b which rotate in unison about central antenna 18. Nine equally spaced reflectors 19 are arranged around outer cylinder 17b. Inner cylinder 17a has one reflector 19a.

The antenna system 16 is mounted externally of the aircraft receiver and is rotated at 15 revolutions per second by synchronous motor 41. Thus, the transmitter pulses from master station 11 are amplitude modulated at a 15 cycle rate due to reflector 19a which produces the cardioid radiation pattern and amplitude modulated at a 135 cycle rate due to the nine reflectors 19 which produce the nine lobed radiation pattern. Each of the modulated signals will have a phase related to the position of the master station relative to the receiver aircraft.

The system of FIG. 1 is provided with a main reference pulse generator 21 and an auxiliary reference pulse generator 22.

Synchronous motor 41 also drives frequency generator 42 in synchronism with antenna 16. Frequency generator 42 provides a sinusoidal output signal which has a phase directly related to antenna rotation. The output of frequency generator 42 is fed directly into trigger circuit 44.

Compass repeater 43, which is conventional equipment in many types of aircraft, provides a sinusoidal output signal having a phase which is proportional to aircraft heading. The output from compass repeater 43 is also fed into trigger circuit.

By comparing the phase relationship of its two inputs trigger circuit 44 may be caused to generate a trigger pulse each time a point (say major lobe 26a) of rotating radiation pattern passes a predetermined direction (say magnetic East) regardless of actual aircraft heading.

Reference pulse generator 21 is triggered by the pulse from trigger circuit 44 and provides as an output a main reference pulse each time major lobe 26a of rotating antenna pattern passes magnetic East.

Reference pulse generator 22 is also connected to trigger circuit 44 and provides as an output nine equally spaced auxiliary reference pulses for each trigger pulse with the first auxiliary reference pulse being coincident with the main reference pulse. The main reference pulses which occur 15 times a second are fed into phase comparator 33 while the auxiliary reference pulses which occur 135 times a second are fed into phase comparator 34.

The rest of FIG. 1 to be described comprises conventional TACAN bearing system equipments. An airborne TACAN receiver 27 is connected via cable 28 to central antenna 18. A 15 and 135 c.p.s. envelope detector of the peak riding type is connected to TACAN receiver 27. Envelope detector 29 is connected to 15 c.p.s. filter 31 and 135 c.p.s. filter 32 as shown. The output terminals of filters 31 and 32 are connected to phase comparators 33 and 34, respectively. The output of phase comparators 33 and 34 are fed into switching circuit 36. Switching circuit 36 has an output terminal connected to bearing indicator 37.

In operation the master station 11 transmits 1350 or more pulses per second. Antenna system 16 mounted external to the receiver aircraft amplitude modulates these pulses at two frequencies. Since antenna system 16 rotates at a rate of 15 revolutions per second, the cardioid radiation pattern amplitude modulates the received pulses at a 15 cycle rate, that is the modulating envelope is a sinusoid having a frequency of 15 c.p.s. At the same time due to the nine lobed radiation pattern the 1350 pulses per second from the master transmitter are amplitude modulated and the resulting envelope is a sinusoid with a frequency of 135 c.p.s. These two modulated signals are received from central antenna 18 by TACAN receiver 27 via cable 28 and fed into envelope detector 29 where the 15 c.p.s. envelope and the 135 c.p.s. envelope are demodulated or converted into actual sinusoidal signals. The output of envelope detector 29 is fed into filters 31 and 32. Filters 31 and 32 separate the two sinusoidal signals so that the 15 c.p.s. sinusoidal signal is fed into phase comparator 33 and the 135 c.p.s. sinusoidal signal is fed into phase comparator 34.

Since the main reference pulse generator 21 provides a pulse which is fed into phase comparator 33 which pulse occurs each time the main lobe of the rotating antenna radiation pattern passes East, the output of phase comparator 33 is a signal proportional to the difference in phase between the main reference pulse and a selected portion of the 15 c.p.s. sinusoidal signal, for example, the zero crossing point or the point of maximum amplitude of that signal. Since the phase of the modulated signals received by TACAN receiver 27 varies with respect to the established time of occurrence of reference bearing signals of the main reference bearing signal, the output from coarse bearing phase comparator 33 is a signal representative of the bearing of the aircraft receiver with respect to the master station. This signal is used to drive the indicating portion of bearing indicator 37 to indicate bearing. The particular manner in which the bearing indicating portion of bearing indicator 37 is energized forms no part of this invention but may be done as by a null type servo motor or alternately a phaser motor. In any case bearing indicator 37 then provides an indication of the aircraft's bearing with respect to the TACAN master station.

After the indicating portion of bearing indicator 37 is positioned by the signal from phase comparator 33, switching circuit 36 automatically operates to switch control of bearing indicator 37 from phase comparator 33 to phase comparator 34. Since the signal from phase comparator 34 is proportional to any phase difference between the auxiliary reference pulses and a predetermined point on the modulated 135 c.p.s. sinusoidal signal, the indicating portion of bearing indicator 37 is further positioned to give a more accurate indication of bearing of the receiver aircraft with respect to the TACAN master station 11.

The above-described TACAN bearing system provides to the aircraft receiver bearing information as accurate as conventional TACAN bearing system utilizing a typical ground station. However, since in many cases the degree of accuracy provided by the above-disclosed system is unnecessary for practical purposes, it is possible to further simplify the TACAN bearing system and to provide a highly practical air-to-air TACAN bearing system. Such a system forms the embodiment disclosed in FIG. 2 of the present invention.

Only those portions of the embodiment in FIG. 2 which differ structurally from the embodiment of FIG. 1 will be discussed in detail.

Antenna system 51 comprises a cylinder which rotates about central antenna 53. The cylinder 52 has one reflector 52a which provides a cardioid antenna radiation pattern. Thus, antenna system 51 is capable of modulating the pulses from master station 11 at one cyclic rate. The size of the rotating antenna needed at the aircraft receiver is greatly reduced and the number of pulses per second needed to be transmitted by master station 11 is greatly reduced. The number of pulses that need to be transmitted by master transmitter 11 is of the order of 150 pulses per second and is a substantial reduction over the number of pulses needed to be transmitted by the conventional TACAN ground station and for that matter a substantial reduction over the number of pulses transmitted by the master station of the embodiment of FIG. 1.

The pulses from master station 11 in FIG. 2 are amplitude modulated at a rate of 15 cycles per second due to the single reflector on rotating cylinder 52 which produces the rotating cardioid antenna radiation pattern. In the same way as the embodiment of FIG. 1 each time a predetermined portion of the cardioid pattern 54 passes a direction such as East, reference pulse generator 21 is triggered providing a main reference pulse for each revolution of the antenna system 51.

The 135 c.p.s. modulated envelope is eliminated from the system because the antenna system no longer has the capability of modulating the received pulses at the 135 c.p.s. rate. However, in order to make the present invention compatible with existing equipment in aircraft receivers some means must be provided to provide phase comparator 34 with a 135 c.p.s. sinusoidal signal. This is so because most airborne receivers are designed to utilize both the coarse and fine signals from the phase comparator 33 and the phase comparator 34, respectively. The manner in which this is done is simply by inserting an oscillator between 15 c.p.s. filter 31 and fine bearing phase comparator 34. This oscillator 46 is triggered by the output from detector 29. Thus, by a simple addition to the existing airborne TACAN equipments in each aircraft receiver it is possible by making use of the 15 cycle modulation signal only to greatly reduce the complexity and size of the antenna that must be mounted on the aircraft receiver as well as the great reduction in power necessary to transmit the greatly reduced number of pulses per second needed by the airborne receiver.

Since only 150 pulses per second are required to support a 15 cycle per second modulated sine wave envelope, the ordinary TACAN transmitter carried by all TACAN equipped aircraft may be used as the master station transmitted because 150 pulses per second happens to be the interrogation rate for airborne TACAN equipments in the search mode. Thus, it is possible for one airplane receiving in the air-to-air TACAN mode to home or obtain bearing from an airborne TACAN transmitting in the normal mode.

A principal advantage aside from the reduction in power and size necessary for the master station by the elimination of the necessity to transmit reference pulses is that reflection errors at the receiving antenna mounted on the aircraft receiver may be minimized in the forward or homing direction. In other words, reflections off the aircraft itself, which are effectively the only reflections that would occur in the air-to-air bearing system of the present invention, may be minimized. In addition, it is possible by conventional means to calibrate out the bearing errors on a receiver aircraft, thus minimizing the effects of the reflections.

Obviously many modifications and variations of the present invention are possible in the light of the above teachings. It is, therefore, to be understood that within the scope of the appended claims the invention may be practiced otherwise than as specifically described.

What is claimed is:

1. In an air-to-air bearing system for use in a receiver aircraft:
   an antenna system in said receiver aircraft having a nine lobed radiation pattern superimposed on a cardioid radiation pattern,
   synchronous motor means connected to said antenna system rotating said antenna system at a predetermined rate for amplitude modulating a signal from a pulse transmitter at a first and second cyclic rate,
   first pulse generator means connected to said synchronous motor means generating a main reference pulse each time a predetermined lobe of said radiation pattern passes a predetermined direction,
   second pulse generator means connected to said first pulse generator means generating an auxiliary reference pulse each time one of said lobes passes said predetermined direction,
   receiver means connected to said antenna system receiving said first and second amplitude modulated signals,
   first circuit means connected to said first pulse generator means and said receiver means providing an output voltage proportional to the difference in phase between said main reference pulse and said first amplitude modulated signal,
   second circuit means connected to said second pulse generator means and said receiver means providing an output voltage proportional to the difference in phase between said second amplitude modulated signal and said auxiliary reference pulses,
   indicator means,
   switching circuit means connecting said first circuit means to said indicator means responsive to zero phase difference between said main reference pulse and said first amplitude modulated signal to automatically connect said second circuit means to said indicator means whereby said indicator displays the bearing of the receiver aircraft relative to the pulse transmitter.

2. In an air-to-air bearing system for use in a receiver aircraft;
   an antenna system in said receiver aircraft having a nine lobed radiation pattern superimposed on a cardioid radiation pattern,
   synchronous motor means connected to said antenna system rotating said antenna system at a predetermined rate for amplitude modulating a signal from a pulse transmitter at a first and second cyclic rate,
   signal generating means connected to said synchronous motor means generating a signal having a frequency proportional to the r.p.m. of said antenna system,
   compass repeater means providing a sinusoidal signal having a phase proportional to receiver aircraft heading deviation from a predetermined direction,
   first pulse generator means connected to said compass repeater means and said signal generating means generating a main reference pulse each time a predetermined lobe of said radiation pattern passes a predetermined direction,
   second pulse generating means connected to said compass repeater means and said signal generating means generating an auxiliary reference pulse each time one of said lobes passes said predetermined direction,
   receiver means connected to said antenna system receiving said amplitude modulated signal,
   phase comparator means connected to said receiver means and said first pulse generator means providing an output voltage proportional to phase difference between said main reference pulse and said modulated signal, indicator means connected to said phase comparator means receiving said output voltage whereby the bearing of the receiver aircraft relative to the pulse transmitter is displayed.

3. In an air-to-air bearing system for use in a receiver aircraft,
   an antenna system in said receiver aircraft having a cardioid radiation pattern,
   synchronous motor means connected to said antenna system rotating said antenna system at a predetermined rate for amplitude modulating a signal from a pulse transmitter,
   first pulse generator means connected to said synchronous motor means generating a main reference pulse each time a predetermined portion of said cardioid radiation pattern passes a predetermined direction,
   second pulse generator means connected to said first pulse generator means generating nine equally spaced, auxiliary reference pulses the first one of which being coincident with said main reference pulse,
   receiver means connected to said antenna system receiving said amplitude modulated signal,
   first circuit means connected to said first pulse generator means and said receiver means providing an output voltage proportional to the difference in phase between said main reference pulse and said amplitude modulated signal,
   oscillator means connected to said first circuit means triggered by said amplitude modulated signal to provide an output sinusoidal voltage simulating an amplitude modulated signal of a frequency nine times the frequency of said amplitude modulated signal,
   second circuit means connected to said second pulse generator means and said oscillator means providing an output voltage proportional to the difference in phase between said auxiliary reference pulses and said simulated amplitude modulated signal,
   indicator means,
   switching circuit means connecting said first circuit means to said indicator means responsive to zero phase difference between said main reference pulse and said first amplitude modulated signal to automatically connect said second circuit means to said indicator means whereby said indicator displays the bearing of the receiver aircraft relative to the pulse transmitter.

4. In an air-to-air bearing system for use in a receiver aircraft:

an antenna system in said receiver aircraft having a cardioid radiation pattern, synchronous motor means connected to said antenna system rotating said antenna system to amplitude modulate received signals from a pulse transmitter, signal generating means connected to said synchronous motor means generating a signal having a frequency proportional to the r.p.m. of said antenna system, compass repeater means providing a sinusoidal signal having a phase proportional to receiver aircraft heading deviation from a predetermined direction, first pulse generator means connected to said signal generating means and said compass repeater means generating a main reference pulse each time a predetermined portion of said cardioid radiation pattern passes a predetermined direction, second pulse generator means connected to said signal generating means and said compass repearter means generating nine equally spaced, auxiliary reference pulses the first one of which being coincident with said main reference pulse, receiver means connected to said antenna system receiving said amplitude modulated signal, first circuit means connected to said first pulse generator means and said receiver means providing an output voltage proportional to the difference in phase between said main reference pulse and said amplitude modulated signal, oscillator means connected to said first circuit means triggered by said amplitude modulated signal to provide an output sinusoidal voltage simulating an amplitude modulated signal of a frequency nine times the frequency of said amplitude modulated signal, second circuit means connected to said second pulse generator means and said oscillator means providing an output voltage proportional to the difference in phase between said auxiliary reference pulses and said simulated amplitude modulated signal, indicator means, switching circuit means connecting said first circuit means to said indicator means responsive to zero phase difference between said main reference pulse and said first amplitude modulated signal to automatically connect said second circuit means to said indicator means whereby said indicator displays the bearing of the receiver aircraft relative to the pulse transmitter.

References Cited by the Examiner

UNITED STATES PATENTS

| | | | |
|---|---|---|---|
| 2,726,389 | 12/55 | Taylor | 343—118X |
| 2,809,552 | 10/57 | Ciavola | 88—14 |
| 2,877,416 | 3/59 | Grisdale | 343—118X |
| 2,938,205 | 5/60 | Mandel | 343—106 |
| 3,007,163 | 10/61 | De Rosa et al. | 343—118 |
| 3,077,597 | 2/63 | Macek | 343—118X |
| 3,077,598 | 2/63 | Jackle | 343—118 |

CHESTER L. JUSTUS, *Primary Examiner*.